United States Patent [19]

Chan et al.

[11] Patent Number: 4,466,892

[45] Date of Patent: Aug. 21, 1984

[54] CAUSTIC FLOODING WITH STABILIZED WATER FOR ENHANCED OIL RECOVERY

[75] Inventors: Keng S. Chan, South Euclid; Stephen J. Majoros, Cleveland Heights, both of Ohio

[73] Assignee: The Standard Oil Company, Cleveland, Ohio

[21] Appl. No.: 343,660

[22] Filed: Jan. 28, 1982

[51] Int. Cl.$^3$ .............................................. E21B 43/22
[52] U.S. Cl. ................................ 252/8.55 D; 166/270; 166/275
[58] Field of Search .................. 252/8.55 D; 166/270, 166/271, 275

[56] References Cited

U.S. PATENT DOCUMENTS

| | | |
|---|---|---|
| 4,006,779 | 2/1977 | Kalfoglou . |
| 4,110,231 | 8/1978 | Swanson . |
| 4,133,385 | 1/1979 | Kalfoglou ....................... 252/8.55 X |
| 4,157,115 | 6/1979 | Kalfoglou . |
| 4,232,738 | 11/1980 | Yen et al. . |
| 4,252,194 | 2/1981 | Felber et al. . |

OTHER PUBLICATIONS

"Status of Caustic & Emulsion Methods", C. E. Johnson, Jr., *Journal of Petroleum Technology,* Jan. 1976, pp. 85–92.

"Experimental Evaluation of Reservoir Pretreatment in Chemical Flooding", H. Surkalo & G. Pouska, Final Report of work performed for the DOE under contract DE-AC 19-79 BC10027, Feb. 1981.

*Primary Examiner*—Herbert B. Guynn
*Attorney, Agent, or Firm*—William A. Heidrich; David J. Untener; Larry W. Evans

[57] ABSTRACT

An improved method for enhanced oil recovery utilizing caustic or alkaline water flooding which avoids precipitation of hydroxides in the injection water or plugging of the reservoir. A lignosulfonate material is blended with the injection water before the addition of the alkaline chemical, the amount of lignosulfonate being sufficient to prevent formation of any precipitates.

7 Claims, No Drawings

CAUSTIC FLOODING WITH STABILIZED WATER FOR ENHANCED OIL RECOVERY

BACKGROUND OF THE INVENTION

1. Field of the Invention

This invention relates to a method for the enhanced recovery of oil from a reservoir. In one aspect, the invention relates to a method for caustic or alkaline waterflooding involving the addition of a lignosulfonate material to the injection fluid. In another aspect, the invention relates to the addition of a lignosulfonate material to seawater or other injection water to prevent the formation of precipitates upon mixing with a caustic material.

2. Discussion of the Art

Enhanced oil recovery (EOR) is a broad concept which encompasses many methods for increasing the recovery of oil remaining in a reservoir after the natural pressures are insufficient for economical production. Primary recovery from a reservoir often produces only 10 to 30 percent of the oil present in the formation. To recover at least a portion of the remaining oil, various supplemental methods are available. For example, a widely practiced secondary recovery technique involves the injection of a driving fluid such as water from one or more injection wells spaced at some distance from the producing well in order to force some of the oil towards the producing well. Tertiary recovery techniques following the waterflood could involve the addition of various amounts and combinations of surfactants, solvents, micellar compositions, and polymers. The reference to the terms secondary and tertiary is unimportant for the purposes of this application, and relates only to the sequence in which the supplemental or enhanced recovery methods are carried out.

Chemical Flooding Methods

There are several chemical waterflooding methods among the techniques proposed for EOR. These involve the addition of one or more chemicals to the injection fluid, either together or in sequence.

Alkaline or caustic flooding uses relatively low concentrations of inexpensive chemicals and is believed to decrease interfacial tension between the injected fluid and the oil. Surfactant flooding uses surface active agents such as petroleum sulfonates, but high cost has prohibited their widespread use. The use of micellar emulsions to thicken the injection fluid is known in the art. Polymers can also be used for mobility control of the front of injected material as it advances through the reservoir.

This invention is concerned only with caustic flooding with stabilized water as later described. The use of other chemical flooding methods or materials in conjunction with caustic flooding is, of course, possible but forms no part of the invention.

The exact mechanism by which caustic flooding is accomplished is not known. According to C. E. Johnson, Jr. ("Status of Caustic and Emulsion Methods," *Journal of Petroleum Technology*, Jan. 1976, 85–92), there are actually several proposed mechanisms for caustic waterflooding. These include:

(1) in-situ emulsification of the crude oil and its entrainment into a continuous flowing alkaline water phase;
(2) wettability reversal of the rock from oil-wet to water-wet;
(3) wettability reversal of the rock from water-wet to oil-wet; and
(4) in situ emulsification of the residual oil in a water-wet core followed by entrapment in smaller pore throats, causing reduced water mobility.

All have been demonstrated to be effective under special circumstances. An understanding of these theories, however, is not necessary to the practice of this invention.

SUMMARY OF THE INVENTION

The invention is a process for producing petroleum from oil-bearing reservoirs by driving a fluid from at least one injection well to a producing well. The process comprises injecting via at least one injection well a blend of injection water, lignosulfonate, and an alkaline material.

DETAILED DESCRIPTION OF THE INVENTION

This invention involves an improved method for caustic flooding whereby a lignosulfonate material is mixed with the injection fluid before introduction of the fluid into the reservoir. The presence of the lignosulfonate appears to prevent the formation of undesirable precipitated compounds which can lead to plugging of the well or the pores of the reservoir. In a preferred embodiment of the invention, lignosulfonate can be combined with mixed with seawater containing divalent ions. The resulting mixture shows no evidence of insoluble precipitate upon mixing with NaOH.

Caustic Flooding

Caustic flooding, also known as alkaline flooding, is a process in which the pH value of the injected flood water is increased by adding a caustic or alkaline chemical. The most common choice of chemical is sodium hydroxide because of its ready availability and low cost, and it will be used in the following discussion to illustrate the invention. Other chemicals which accomplish the same result, including but not limited to sodium carbonate, barium hydroxide, trisodium phosphate, polyethylenimine, and ammonia, are contemplated equivalents for purposes of this invention.

Sodium hydroxide (NaOH) is mixed with the injection water to form a solution before introduction into the reservoir. The solutions can range from about 0.1 to 5 percent or more NaOH by weight, but typically are less than 1 percent in actual use. The actual amount of NaOH to be used depends upon the peculiar characteristics of both the rock and the oil in a reservoir. Further directions are available to those skilled in the art from a number of published materials, including a monthly series of articles on EOR techniques by N. Mungan published in *World Oil* beginning February, 1981. Conventional caustic flowing techniques known in the art can be used in conjunction with the inventive process.

Injection Water

The injection water used in this invention can come from any convenient source. Previously, the choice of a fluid for caustic flooding was restricted because of the necessity to prevent significant premature plugging of the reservoir. Plugging often resulted when the hydroxide ($OH^-$) ions from the NaOH contacted the divalent ions (typically calcium, magnesium, and barium) naturally present in the injection water or in the connate water, forming insoluble precipitates.

To address this problem, suggestions have been made in the prior art to soften the injection water through ion exchange to remove the divalent ions. Another approach involved removing the precipitated hydroxides by filtration before the mixture was injected into the reservoir. Still another involves injection of fresh or treated "soft" water into the reservoir in order to condition the reservoir and prevent serious plugging near the well site. The present invention obviates the need for such procedures.

The water for injection can therefore be withdrawn from any suitable source with minimal concern for its salinity, particularly the presence of divalent cations. A preferred embodiment of the invention permits the use of ordinary seawater. This aspect of the invention can be especially advantageous if the well is located in a coastal area or off-shore where fresh water is valued more highly for alternate uses.

Lignosulfonate

Lignosulfonate is a general term applied to materials that are most commonly derived from the wood pulping process, and obtained by sulfonating alkali lignins. Lignin is a polymer which is the second only to cellulose as the principal constituent of woody plants. Lignins and their derivatives are described more fully in the *Kirk-Othmer Encyclopedia of Chemical Technology*, Third Edition, Vol. 14, pp 294–312, the disclosure of which is incorporated by reference.

Uses of lignosulfonates in other EOR techniques have been proposed, including its use as a sacrificial material to be mixed with a surfactant as described in U.S. Pat. No. 4,157,115 to Kalfoglou. An aqueous solution of the lignosulfonate can also precede the lignosulfonate-surfactant mixture into the injection well. The description of lignosulfonate material in the above patent is generally useful for further information and it is hereby incorporated by reference.

Any suitable lignosulfonate material as described above can be used in the practice of this invention. Particularly preferred, however, are lignosulfonates which are capable of preventing significant precipitation of insoluble hydroxides at the conditions found in the reservoir. Preferred sources and types of lignosulfonates can be readily identified for a particular injection water by adding small known amounts (usually 15 wt % or less) of the lignosulfonate to a beaker of the injection water, followed by the addition of NaOH. If no precipitate forms as NaOH is added, the lignosulfonate is suitable for use with that source of injection water. Minimal effective amounts can be determined by repeating the procedure above using lesser amounts of the lignosulfonate, until precipitation occurs.

Because of the variations among commercial pulping and sulfonation processes, the product lignosulfonates may be more or less suitable for use with this invention. Optimization of the amounts used and the particular selection of lignosulfonate material is within the skill of workers in the art from the directions given herein and in published literature.

Commercially available lignosulfonates are typically furnished as a powder or in a pre-solubilized form. Either form is suitable for use in the inventive process. If poorer grades of material containing minute particles of cellulose are used, it is advantageous to filter the cellulose from the injection water to avoid any plugging of the reservoir.

The Process

The process of the invention is accomplished by adding lignosulfonate to the injection water in an amount sufficient to prevent the precipitation of insoluble compounds such as the hydroxides of divalent cations. The order of addition is crucial to the success of the process. The lignosulfonate and injection water must be mixed together before any alkaline material is added. Otherwise, precipitation would occur immediately and subsequent addition of lignosulfonate would have little if any effect.

Although the relative proportions of alkaline material and lignosulfonate in the water can vary widely, the preferred proportions are at or near the minimum amounts necessary to accomplish the intended technical effect. In EOR flooding operations, the cost of the chemicals used is usually the limiting factor.

As one example, a powdered lignosulfonate could be added to a tank of water in a weight ratio of about 1 to 50. This solution is then withdrawn after removing any solids (e.g. cellulose) which may be present by filtration or settling. Sodium hydroxide can then be added in any desired proportion, such as 1 to 100.

The resulting blend of injection water, lignosulfonate, and sodium hydroxide is then injected into one or more injection wells, by methods well known in the art. This fluid blend is then driven through the reservoir by injecting additional amounts of fluid into the injection well, forcing petroleum towards the producing well.

SPECIFIC EMBODIMENTS

Example 1

A solution of lignosulfonate in seawater was prepared by the following method, with percentages expressed by weight. The seawater included about 700 ppm magnesium and 250 ppm calcium, by weight. A commercially available solubilized lignosulfonate, ERA-4 (a lignosulfonate product containing about 30–40% solid material and manufactured by American Can Company, Greenwich, Connecticut) was added to the seawater and mixed well. The mixture was translucent and had no precipitate.

Sodium hydroxide pellets were added to the above mixture and the solution was stirred. The mixture consisting of 96% seawater, 3% lignosulfonate, and 1% sodium hydroxide showed no formation of insoluble hydroxides.

Example 2

A second solution was prepared by the method described in Example 1, except that the solution consisted of 90% seawater, 5% lignosulfonate and 5% sodium hydroxide. No precipitate formed.

Example 3

A third solution was prepared using 84% seawater, 6% lignosulfonate, and 10% sodium hydroxide. No precipitate formed.

The solution of Example 3 was used in a core test using a conventional Berea sandstone core. Good recovery was obtained from this system.

Comparative Example A

A fourth solution was prepared using 98% seawater, 1% lignosulfonate, and 1% sodium hydroxide. A greenish-brown precipitate formed immediately upon addition of the sodium hydroxide pellets.

While not intending to be bound by theory, observations suggest that the lignosulfonate is stabilizing the seawater rather than neutralizing the added sodium hydroxide. As noted in the above examples, a minimal amount (above 1%) of the lignosulfonate tested was essential to prevent precipitation of sodium hydroxide added even in trace amounts. The test solutions also retained a high pH value (above 12), confirming their potential effectiveness when used in EOR processes.

Although only a few embodiments of the invention have been described above, many modifications can be made without departing from the spirit and scope of the invention. All such modifications are intended to be included within the scope of the invention, which is to be limited only by the following claims.

We claim:

1. A process for producing petroleum from oil-bearing reservoirs by driving a fluid from at least one injection well to a producing well, the process comprising injecting via the injection well a blend of injection water containing divalent metal ions, lignosulfonate in an amount sufficient to prevent significant precipitation of insoluble compounds, and an alkaline material selected from the group consisting of sodium hydroxide, sodium carbonate, trisodium phosphate, and ammonia, provided that the lignosulfonate is mixed with the injection water before the addition of the alkaline material.

2. The process of claim 1 in which the alkaline material is sodium hydroxide.

3. The process of claim 2 in which the injection water comprises seawater.

4. The process of claim 3 in which the lignosulfonate is added to the injection water in a pre-solubilized form.

5. The process of claim 3 in which the lignosulfonate is in a powdered form.

6. The process of claim 3 in which the blend to be injected comprises at least 1 wt % lignosulfonate.

7. The process of claim 6 in which the blend comprises at least 3 wt % lignosulfonate.

* * * * *